Patented July 22, 1952

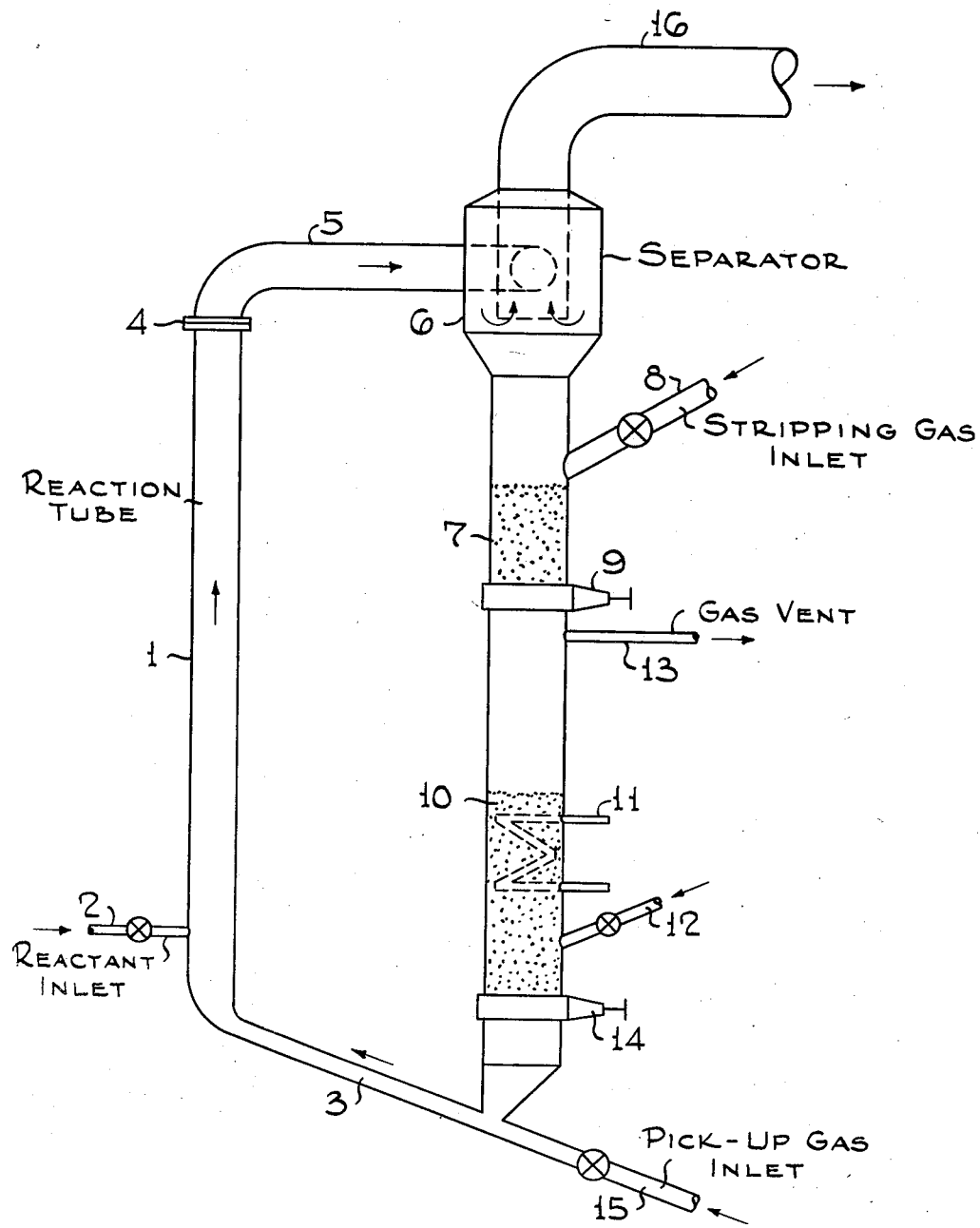

2,604,479

UNITED STATES PATENT OFFICE 2,604,479

SELECTIVE OXIDATION WITH SUSPENDED CATALYST

Walter F. Rollman, Cranford, N. J., assignor to Standard Oil Development Company, a corporation of Delaware Application August 5, 1949, Serial No. 108,738

2 Claims. (Cl. 260—342.5)

This invention relates to improvements in conducting a catalytic vapor phase selective oxidation of organic compounds using a suspended catalyst in concurrent flow.

This application is a continuation-in-part of my application Serial Number 41,607, filed July 30, 1948, now Patent No. 2,526,689, which is a continuation-in-part of my application Serial Number 662,907, filed April 17, 1946, now abandoned, describing the general system of carrying out a selective partial oxidation process with concurrent flow of suspended catalysts.

The principal factors affecting operability and controls with which the present application is concerned are briefly summarized as follows:

(a) Use of preheated pick-up gas for conveying a suspension of the catalyst into the reaction zone, the pick-up gas, more particularly, being air or oxygen-containing gas which is preheated to a temperature of between 550° and 900° F., i. e., to a higher temperature than that of organic reactant vapor introduced at the reaction zone inlet;

(b) Restricting the temperature of the organic reactant vapor introduced at the reaction zone inlet to below 550° F. and preferably below 500° F.;

(c) Cooling metal walls that contact with the reaction vapor products carrying suspended catalyst to temperatures substantially below the temperatures of the vapor products, e. g. to below 850° F. and preferably below 800° F., while the temperature of the catalyst being separated is not substantially lowered;

(d) Stripping adsorbed vapor from the catalyst, especially with air preheated to temperatures of 550° F. to 900° F.;

(e) Separately removing spent reactivation gas to prevent mixing of this gas with desired vapor products.

The method of this invention involves carrying out a catalytic vapor phase partial oxidation reaction continuously, wherein the catalyst maintained at a critically controlled optimum reaction temperature is carried in suspension concurrently with a stream of reactant vapor through a reaction zone for a uniform short reaction period, then is abruptly disengaged from the resulting gaseous reaction products, stripped free of adsorbed vapors by a stripping gas, reactivated, and returned at the reaction temperature to the inlet of the reaction zone. In this operation, the reactant vapor being introduced should be brought instantaneously up to the required reaction temperature on entering the reaction zone and the temperature of the catalyst being passed through the cycle should be kept as nearly constant as possible for control within optimum limits.

Extensive investigations of the selective partial oxidation reactions, as for example, the partial oxidation of aromatic compounds, such as ortho toluic acid, ortho xylene, and naphthalenes to phthalic anhydride, have shown that these reactions are best accomplished when the reactant vapors are contacted with active catalysts at the required reaction temperature for a limited uniform period of relatively short duration and when the vaporous products formed at close to 100% conversion of the organic compound being oxidized are abruptly disengaged from the catalyst. These requirements are not completely satisfactorily met in conventional fluidized catalyst systems on account of entrapment and turbulence which results in recirculation of vapor reaction products and spent catalyst in the reaction zone, and on account of catalyst entrainment, lack of stripping, and difficulties of temperature control where materials are introduced and where vaporous products pass from a fluidized bed.

The method of accomplishing the desired objects, in accordance with the present invention, can be carried out in an apparatus of simple construction and operation, and the method is very flexible with close control of all necessary conditions.

A preferred embodiment of the invention will be described with reference to the accompanying drawing, in which is schmatically shown an elevational view of a useful type of reaction vessel with its accessories.

Referring to the drawing, the reaction tube 1 is simply a vertical tubular conduit of relatively narrow cross-section into the bottom inlet of which is fed an organic reactant vapor stream at below the reaction temperature from line 2 and suspended catalyst of proper activation and higher temperature for immediately initiating reaction from line 3. The top end of the reaction tube is joined through an intermediate insulating gasket 4 to an extension or top transfer tube 5 which discharges at its outlet end into a separator, such as, a cyclone separator 6. The transfer tube 5 can be positioned in a cooling medium or exposed for desired heat radiation and cooling by convection. Similarly, the walls of the separator 6 can be maintained at a desired lowered temperature. The spent catalyst is disengaged abruptly from the vaporous product stream in the separator 6 and then drops downwardly into a receiving vessel or standpipe 7.

Stripping gas, such as a current of steam, preheated air or steam-air mixtures at temperatures of about 550° F. to 900° F. is injected into the upper part of standpipe 7 from line 8 close to separator 6 and serves to remove quickly and thoroughly entrained vapors from the catalyst just as the catalyst, remaining at the reaction temperature, is dropped out of the vaporous products stream, that is then withdrawn through pipe 16 to a suitable recovery unit, which may include conventional means (not shown) such as a filter, scrubber and condenser. The stripping gas, at the same time, serves to act as a seal in an intermediate upper part of the standpipe 7 above slide valve 9. The stripped catalyst is permitted to flow past slide valve 9, or any other suitable flow regulating device, into a bottom section of standpipe 7, where it is collected in section 10 as a fluidized bed.

A heat exchange coil 11 in the lower section 10 is used to control the temperature of the catalyst while the catalyst in section 10 is contacted with a stream of oxygen-containing gas, such as air or air mixed with steam, injected through line 12. The temperature control in section 10 is quite important because the catalyst at this point is advantageously maintained near the minimum or desired temperature at the inlet of the reaction tube, at the same time preventing undesired sintering or fusing of the catalyst while it is being reactivated. In general, this minimum temperature is about 800° F. and the maximum is about 1100° F. in employing vanadium oxide-containing catalysts and other types of oxidation catalysts. A spent reactivation gas vent line 13 is provided to remove the hot spent reactivating gases from the standpipe so that these gases do not flow up into the separator 6, and do not become mixed with the vaporous product withdrawn through pipe 16. A slide valve 14 at the bottom of standpipe 7 regulates the flow of catalyst to the pick-up line 3. A pick-up gas, such as, air, free oxygen gas, or an air-steam mixture preheated to a temperature of 550° F. to 900° F. is injected into the pick-up line 3 from line 15 to aid in returning the active catalyst to the reactor. The thus preheated pick-up gas does not excessively reduce the catalyst surface temperature, but aids in quickly bringing the reactant organic vapor to the reaction temperature for promptly initiating reaction.

The described type of operation can be used for selective partial oxidation reactions for many types of organic compounds. The process is especially applicable to partial oxidation of aromatic compounds and various other types of hydrocarbons. As already stated, it is useful in forming phthalic anhydride from toluic acid, ortho xylene and naphthalenes. It is useful in catalytic partial oxidation of benzene and $C_4$ to $C_6$ fractions containing butenes, butadienes, isoprene and methyl pentadienes to maleic anhydride, in the conversion of ethylene to ethylene oxide using, for example, a silver-containing catalyst, or the conversion of propylene to acrolein using a copper oxide catalyst. Various other oxidation reactions will be familiar to those skilled in the art as requiring precision control of temperature, catalyst activity and time for high conversion and high selectivity.

In the selective partial oxidation reactions the reaction temperatures which can be used are dependent on the kind and concentration of the reactant vapor. These temperatures, in general, are in the range of 800° F. to 1100° F., and for optimum results, a narrower critical reaction temperature range within this broad range is required. Peculiarly different from most other reactions, the selective partial oxidation becomes more selective as the conversion is increased, provided the reactant is exposed to the catalyst at the optimum temperature for the required short contact period, which is a matter of only a few tenths of a second, for example, in the oxidation of aromatic hydrocarbons with pure $V_2O_5$ catalysts. The higher optimum temperatures are used with lower feed concentrations, for example above 950° F. with concentrations of about and below 1.5 mol per cent of the organic reactant in the gaseous stream; the lower temperatures of 800° F. to 950° F. are used with the higher reactant concentrations.

In each of the operations, the reactant vapor feed entering the reaction zone, or just prior to becoming mixed with the catalyst, should be at a temperature which is below the oxidation reaction temperature, so that the chance of nonselective reaction prior to mixing with the catalyst is minimized. Then, the reactant organic vapor, on coming into contact with the hotter catalyst suspended in preheated pick-up gas of larger volume, enters the reaction zone and forms a reaction mixture which is immediately at the optimum reaction temperature for immediate initiation of the reaction. The oxidation reactions are, in general, exothermic and the temperatures of the reacting vapors will tend to be increased as the reaction mixture travels from the bottom inlet to the top end of the reaction zone concurrently with the suspended hot catalyst in a few tenths of a second.

Studies made of comparative test data indicate that better control of reaction temperatures, with less deviation and better selectivity, is obtained when the temperature of the organic vapor feed to the reaction zone inlet is restricted. Some of the data illustrating this feature is presented in the following Table I.

TABLE I

EFFECTS OF INLET ORGANIC VAPOR TEMPERATURES

*Concurrent flow of suspended catalyst*

[40-80 mesh $V_2O_5$ catalyst; 3:1 Mole percent, naphthalene in air]

| Variables | Test Runs | | | |
|---|---|---|---|---|
| | 1 | 2 | 3 | 4 |
| Organic Vapor Inlet Temp., °F | 475 | 490 | 495 | 502 |
| Reactor Vapor Bottom Temp. °F | 775 | 810 | 820 | 845 |
| Reactor Vapor Top Temp. °F | 810 | 855 | 870 | 888 |
| Selectivity, Percent (Conversion to Phthalic Anhydride) | 78 | 72 | 65 | 59 |

The above data shows the trend of greater temperature deviations in the reaction zone when the inlet temperature of the reactant is not restricted to maintain an optimum reaction temperature, which in this instance, is about 800° F.

Likewise, when the optimum reaction temperature is in the range of 950° F. to 1100° F., it is advantageous to restrict the inlet organic vapor temperature, in general, to below 550° F. and preferably to below 500° F.

Following the achievement of the desired conversion, or maximum conversion, there is a tendency for the occurrence of adverse surface effects where the gaseous reaction products contact with highly heated metal surfaces, during the separation of the hot catalyst and just prior thereto without excessive cooling of the reaction products or catalysts. Experimental work has shown that it is possible to accomplish this cooling of the contact wall surfaces of the separator 6, and also of the top transfer line 5, and thereby minimize non-selective reaction to degradation products. These contact walls can be cooled advantageously to a temperature that is about 100 Fahrenheit degrees lower than the temperature of the vapors, e. g. to 850° F. or less, without having to remove much heat from the catalyst or without having to dilute the vaporous products with a cooling fluid, simply by diminishing conduction of heat to these metal walls from the portions of the reactor which are necessarily at a high temperature and rapidly removing heat from the metal walls by radiation and convection.

It was found that the reaction product vapors themselves are relatively stable in the vapor phase at 800° to 1100° F. and do not have to be cooled quickly to a lower temperature if they do not contact hot metal surfaces having temperatures much above 800° F. and if the catalyst is separated with reasonable promptness. It is undesirable to chill the vapors too extensively, because the vapors tend to carry an appreciable amount of tarry substances which would then be condensed and precipitated onto the catalyst, and thus might create explosion hazards. A small accumulation of tar deposits on the catalyst makes a rather explosive combination. Furthermore, for heat economy and in the interest of keeping the catalyst activated, it is best to maintain the catalyst at a temperature above 800° F. Hence, in the desired operation the vapors being disengaged from the catalyst and removed from the cyclone separator are suitably maintained at a temperature above 800° F. while the cyclone metal is maintained at a lower temperature, such as, below 850° F. and preferably below 800° F. Surprisingly good results were obtained in using preheated air as a stripping gas.

The effect of the metal wall temperatures in the cyclone separator on selectivity to phthalic anhydride obtained from naphthalene is illustrated by the following summarized data. These data show that in order to obtain increased and maximum selectivity the temperatures of metal surfaces contacting with the reaction products leaving the reaction zone and during disengagement of the catalyst should be substantially below the reaction zone temperature, that is at least about 100° F. below the reaction zone temperature; at least below 850° F., preferably below 800° F.

The control of the metal temperatures in the separator and conduit leading to the separator is especially important for increasing selectivity when the metal walls have a non-selective action and it has been noted that small amounts of fine particles of metal oxide catalysts scattered on the metal walls appear to promote the non-selective reaction.

While the catalyst is being separated from the vaporous products, a certain amount of vapors are entrained or adsorbed by the catalyst particles, which may be visualized as a carrying along by each particle of a vapor film. Such entrained vapors are readily removed from the catalyst as it is being disengaged from the vapors and is dropping past a current of stripping gas, illustrated in the drawing as introduced by line 8. It has been found that a reasonably low quantity of steam, air, or an air-steam mixture introduced as a stripping gas approximately normal or perpendicular to the path of the falling solid catalyst particles easily accomplishes the desired removal of the organic vapors from the catalyst. With a superficial stripping-steam velocity of only about 1 ft. per second for a 1 inch diameter standpipe used in this manner adequate stripping was obtained without excessive dilution of the reaction vapor products.

For the suspended catalyst operation described, relatively coarse and heavy catalyst particles are more suitable than very fine dust particles. No special provision is necessary for recovery of the fine catalyst particles and quick disengagement of the catalyst particles is obtained when the catalyst particles range in size from 20–80 mesh.

A particularly valuable form of catalyst found very useful in this type of operation is obtained by fusing the catalyst and subjecting it to rapid cooling under such conditions that it assumes a spherical shape. These so called microspheres are easily made, are readily circulated, and readily disengaged at reasonable vapor velocities. They are also satisfactorily free of attrition difficulties.

As previously mentioned, the catalyst particles after separation from the vaporous products and in their passage down through the standpipe, are to be maintained at an elevated temperature in the neighborhood of the optimum reaction temperatures, and, therefore, they are not subjected to substantial cooling while they are being disengaged, stripped, reactivated or returned to reaction zone. In general, they are maintained at an approximately constant temperature within the range of 800° F.–1100° F. and more particularly at temperatures close to the initial temperature desired in the inlet of the

TABLE II

Effects of Cyclone Metal Temperatures on Selectivities

*Comparative test data*

[Conditions: Concurrent flow of suspended catalyst; naphthalene concentration in air, 1 to 1.5 mole per cent; catalyst, 40-80 mesh V₂O₅ microspheres]

| Variables | Test Runs | | | | | | |
|---|---|---|---|---|---|---|---|
| | 1 | 2 | 3 | 4 | 5 | 6 | 7 |
| Reaction Zone Temp., °F | 949 | 950 | 947 | 950 | 1,000 | 1,000 | 1,000 |
| Cyclone Vapor Temp., °F | 910 | 950 | 951 | 950 | 885 | 1,000 | 1,000 |
| Cyclone Metal Temp., °F | 814 | 850 | 886 | 900 | 732 | 850 | 900 |
| Selectivity, Percent (Conversion to Phthalic Anhydride) | 82 | 79 | 72 | 69 | 90 | 88 | 79 | reaction zone. In passing through the reaction the temperature of the catalyst may be progressively increased or decreased to a small extent.

A number of modifications can be made in the operating system while employing the principles of operation set forth. A number of reaction tubes may be used together in one unit and the size of the tubes may be varied to obtain increased capacity. For simplifying construction one standpipe may be used to serve a number of reaction tubes.

To illustrate satisfactory controls in the short contact concurrent flow of suspended catalyst operation the following specific examples with test data are presented.

EXAMPLE I

| Operation | Suspended Catalyst Concurrent Flow |
|---|---|
| Reactor | 0.55″ I. D. |
| Standpipe | 0.96″ I. D. |
| Catalyst | [2] 100% |
| Size Mesh | 40–60 |
| Feed Concentration of Naphthalene percent mole in air | 1.4 |
| Vapor Velocity ft./sec | 15 |
| Contact time, sec | 0.5 |
| Catalyst Loading, lbs./cu. ft. at operating conditions | 1.0 |
| Average Reaction Zone Vapor Temp., °F | 935 |
| Reactant Feed Inlet Temp., °F | 490 |
| Catalyst Inlet Temp., °F [1] | 947 |
| Reactor Vapor Bottom Temp., °F | 950 |
| Reactor Metal Bottom Temp., °F | 840 |
| Reactor Vapor Top Temp., °F | 1,020 |
| Reactor Metal Top Temp., °F | 949 |
| Top Transfer Line Metal Temp., °F | 710 |
| Cyclone Metal Temp., °F | 730 |
| Cyclone Vapor Temp., °F | 890 |
| Standpipe Metal Temps., °F | 975–995 |
| *Yield Data:* | |
| Total Acids mole percent | 95.6 |
| Phthalic Anhydride mole percent | 86.6 |
| Maleic Anhydride mole percent | 9 |
| Conversion mole percent | 96.3 |
| Selectivity percent | 90 |

[1] Standpipe bottom vapor temperature.
[2] Vanadium oxide microspheres.

When the foregoing operation is compared to fixed bed and conventional fluid catalysts operations using optimum reaction temperatures on the same type of feed, it is found that the fluidized catalyst process gives a selectivity of only about 65% and the fixed bed operation gives a selectivity of only about 76% or so on an industrial scale. Also, when the concurrent flow of suspended catalyst operation is not properly controlled with regard to reaction temperatures and metal temperatures following the reaction zones, the selectivities fall to the order of 65–76% or less in the partial oxidation of naphthalene to phthalic anhydride.

EXAMPLE II

Using the concurrent flow suspended catalyst system for selective partial oxidation of ortho xylene, the same controls are employed for obtaining maximum selectivities and conversions of the ortho xylene to phthalic anhydride. The ortho xylene vapor at about 238° F. is brought into contact with vanadium oxide catalyst at a temperature between 900° and 1025° F. suspended in air preheated to a temperature in the range of 550° F. to 900° F. Feed concentration of the ortho xylene in air will generally be about 1.4–4 mole per cent. In this mixture the reactant vapor begins reaction at once and in a short period of .3 to .7 second complete conversion is obtained. Thereupon the vapor reaction products and catalysts are discharged through a transfer line and into a cyclone separator having lowered wall temperatures, below 800° F., to prevent nonselective degradation of the reaction products. During the separation, the reaction product vapors and catalyst are not cooled to below 800° F. At comparable conditions, selectivity to phthalic anhydride from orthoxylene is about 15% less than from naphthalene. On this basis, about 60 mol per cent phthalic anhydride can be expected from 2–2.5 mole per cent ortho xylene in air.

EXAMPLE III

In a selective partial oxidation of toluic acid to form phthalic anhydride a strict control of temperature and time is essential since the toluic acid very quickly is converted to phthalic anhydride in the presence of vanadium oxide catalysts.

Using the method of flowing suspended catalyst concurrently with the reactant vapor most advantageously, the active catalyst at a temperature of about 850° F. suspended in preheated air preheated to about 600° F. is mixed with o-toluic acid vapor entering the reaction zone at between 490° and 500° F. so that about 2 to 5 mole per cent of the reactant o-toluic acid vapor is present in the gaseous mixture and is contacted with the catalyst for 0.1 to 0.5 second at reaction temperatures close to 850° F. The reaction products carry the suspended catalyst into the separation zone, and the metal walls of the cyclone separator are kept at a temperature below 800° F. although the vapors being separated are approximately at 850° F.

EXAMPLE IV

In the selective partial oxidation of $C_4$ and $C_5$ olefins using 40–80 mesh molybdenum-vanadium oxide or pure vanadium oxide catalyst in a suspended concurrent flow the optimum average reaction zone vapor temperatures are of the order of 850°–950° F. for concentration of 1–5 mole percent of the hydrocarbons in air with a short contact time of .3–.6 second. Here again improved selectivities are obtained by having the gaseous hydrocarbons at a relatively low temperature, e. g. below 500° F., enter the reaction zone to contact suspended catalyst entering the reaction zone at temperatures of 850° F.–950° F. and by cooling the metal walls of the upper transfer line and cyclone separator to below 850° F. In this operation the reactivated catalyst is picked-up by air preheated to a temperature of 550°–650° F.

What is claimed is:

1. The method of catalytically partially oxidizing an organic reactant selected from the class consisting of $C_2$ to $C_6$ olefins and aromatic compounds to form an oxygenated derivative of the organic reactant, which comprises flowing the organic reactant in vapor phase at a temperature below 550° F. into the inlet of a reaction zone, contacting the organic reactant vapor with an oxidation catalyst suspended in an oxygen-containing gas entering the reaction zone at a temperature between 800° F. and 1100° F., passing the suspended catalyst uniformly and substantially at the same velocity as the reactant vapor through the reaction zone for a contact period of less than one second therein, discharging resulting vapor products with the suspended catalyst from the end of the reaction zone into a separation zone, cooling metal surfaces that contact with the reaction products and suspended catalyst to a temperature below 800° F., stripping vapor from the catalyst as it is disengaged from the vapor products at above 800° F. in said separation zone, passing the stripped catalyst into a reactivation zone at a temperature within the range of 800° F. to 1100° F., reactivating the stripped catalyst with an oxygen-containing gas in said reactivation zone, separately removing spent reactivation gases from said reactivation zone, and suspending the reactivated catalyst in oxygen-containing gas preheated to a temperature in the range of 550° to 900° F. in recycling the reactivated catalyst at the reaction temperature between 800° F. and 1100° F. to the inlet of the reaction zone.

2. The method of catalytically partially oxidizing an aromatic compound to phthalic anhydride which comprises flowing the aromatic compound in vapor phase at a temperature below 550° F. into the inlet of a reaction zone, contacting said vapor with an oxidization catalyst suspended in an oxygen-containing gas entering the reaction zone at a temperature between 800° and 1100° F., passing the suspended catalyst uniformly and substantially at the same velocity as the reactant vapor through the reaction zone for a contact period of less than 1 second therein, discharging resulting vapor products with the suspended catalyst from the end of the reaction zone into a separation zone, cooling metal surfaces that contact with the reaction products and suspended catalyst to a temperature below 800° F., stripping vapor from the catalyst as it is disengaged from the vapor products at above 800° F. in said separation zone, passing the stripped catalyst into a reactivation zone at a temperature within the range of 800° F. to 1100° F., reactivating the stripped catalyst with an oxygen containing gas in said reactivation zone, separately removing spent reactivation gases from said reactivation zone, and suspending the reactivated catalyst in air preheated to a temperature in the range of 550° F. to 900° F., in recycling the reactivated catalyst at the reaction temperature between 800° F. and 1100° F. to the inlet of the reaction zone.

WALTER F. ROLLMAN.

REFERENCES CITED

The following references are of record in the file of this patent:

UNITED STATES PATENTS

| Number | Name | Date |
|---|---|---|
| 1,295,825 | Ellis | Feb. 25, 1919 |
| 2,351,793 | Voorhees | June 20, 1944 |
| 2,373,008 | Becker | Apr. 3, 1945 |
| 2,396,109 | Martin | Mar. 5, 1946 |

OTHER REFERENCES

Dunstan et al.: "The Science of Petroleum," vol. II, pp. 1401, 1404.